H. D. HERSHEY.
CONTINUOUS DRAW VACUUM WINDOW GLASS MACHINE.
APPLICATION FILED JAN. 22, 1908.
901,170.
Patented Oct. 13, 1908.
4 SHEETS—SHEET 1.
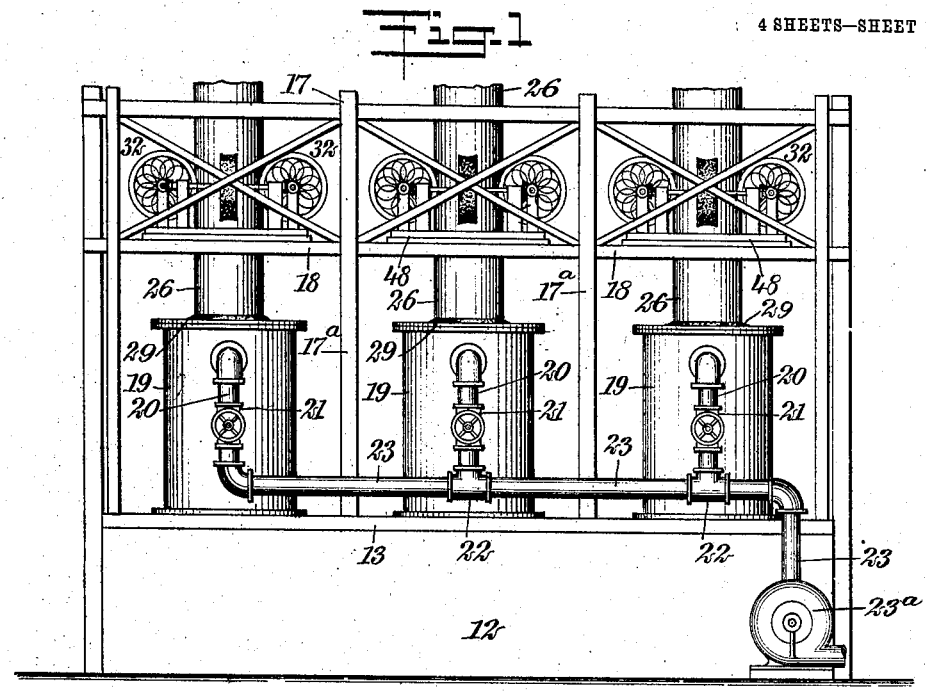
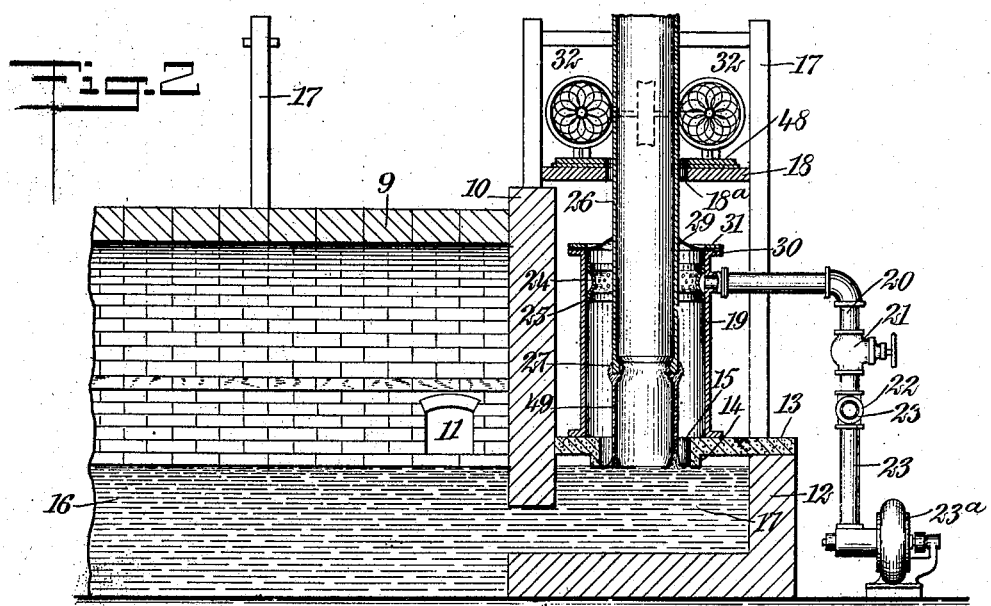
WITNESSES
INVENTOR
Harry D. Hershey
BY
ATTORNEYS H. D. HERSHEY.
CONTINUOUS DRAW VACUUM WINDOW GLASS MACHINE.
APPLICATION FILED JAN. 22, 1908.
901,170.
Patented Oct. 13, 1908.
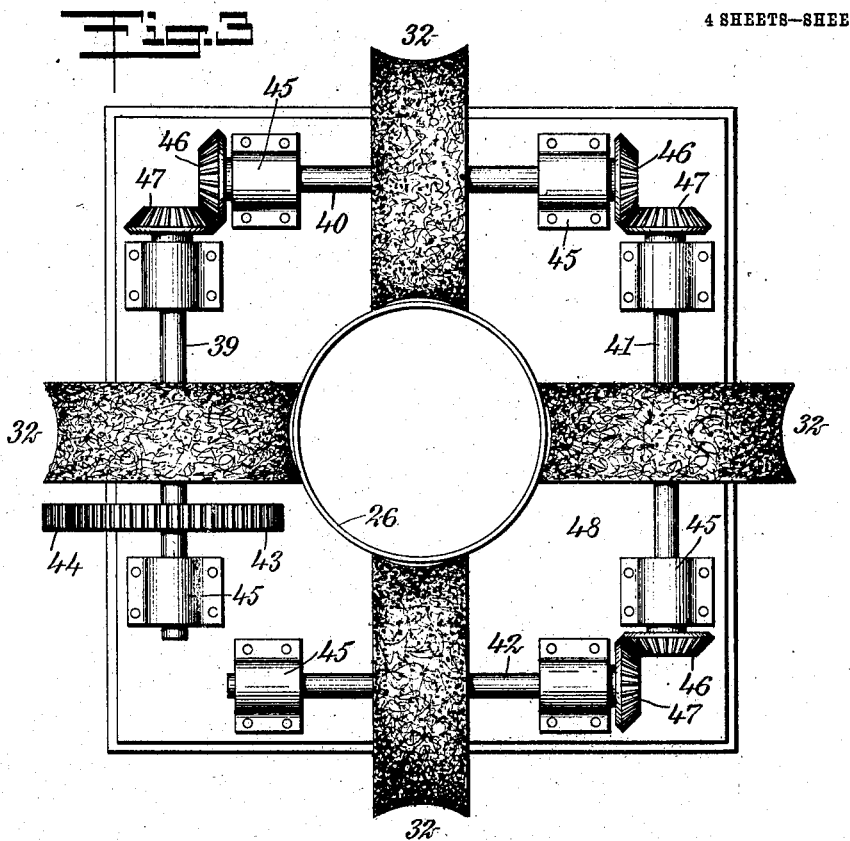
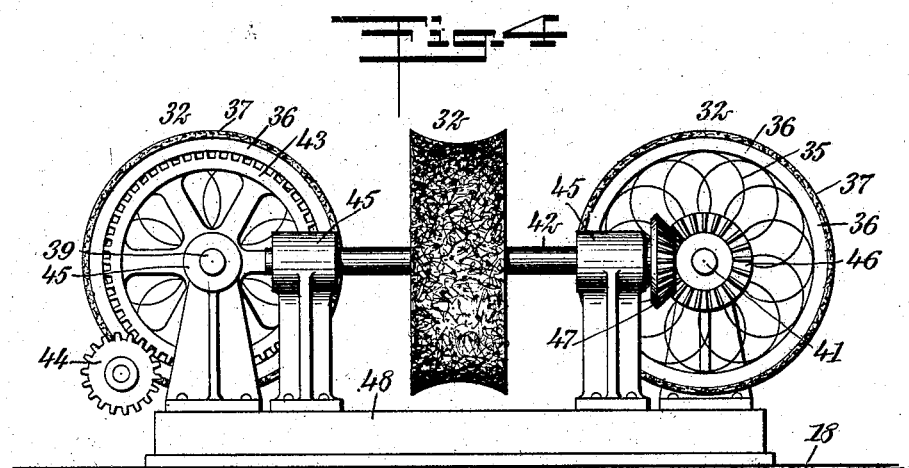
WITNESSES
INVENTOR
Harry D. Hershey
BY
ATTORNEYS H. D. HERSHEY.
CONTINUOUS DRAW VACUUM WINDOW GLASS MACHINE.
APPLICATION FILED JAN. 22, 1908.
901,170.
Patented Oct. 13, 1908.
4 SHEETS—SHEET 3.
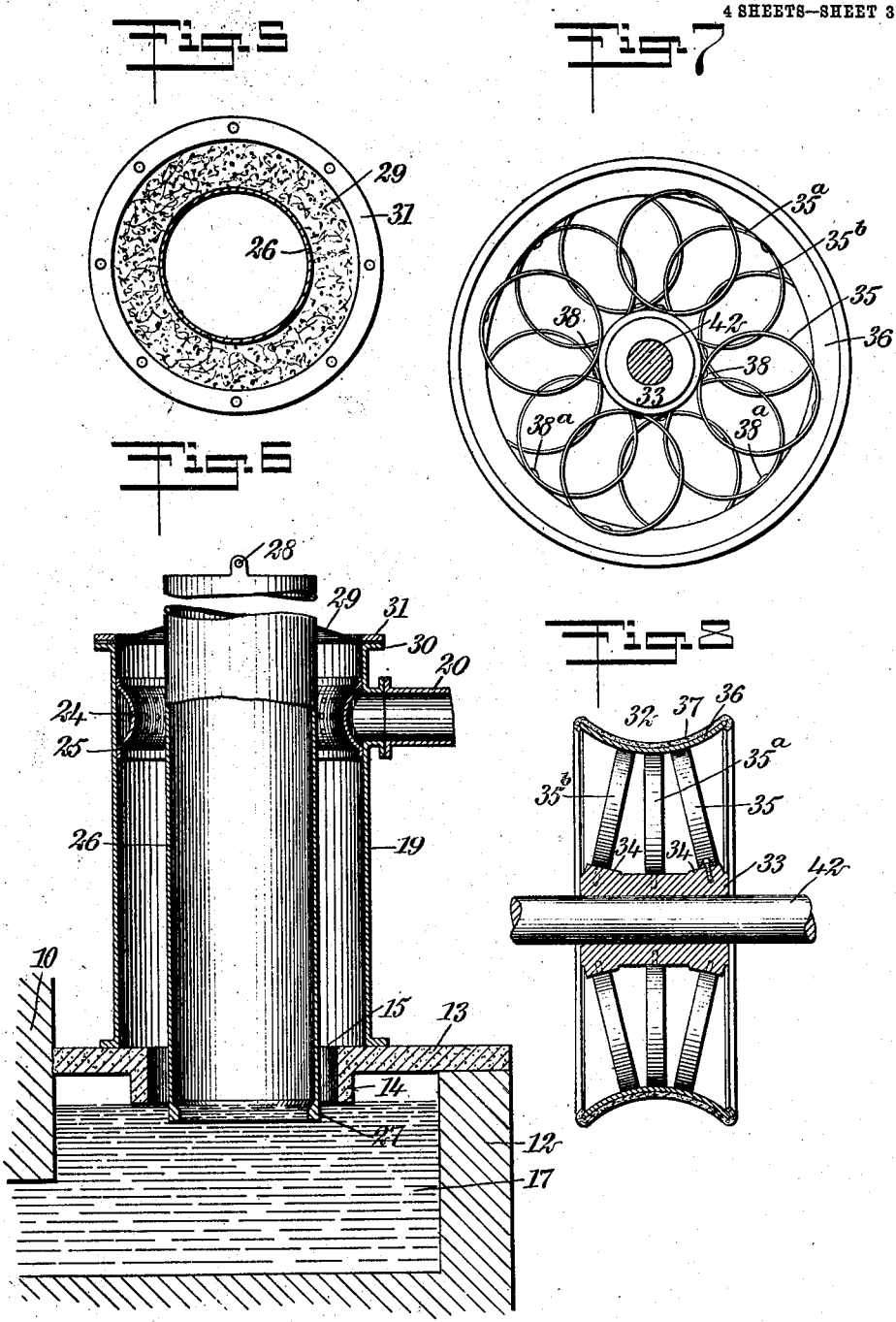
WITNESSES
INVENTOR
Harry D. Hershey
BY
ATTORNEYS

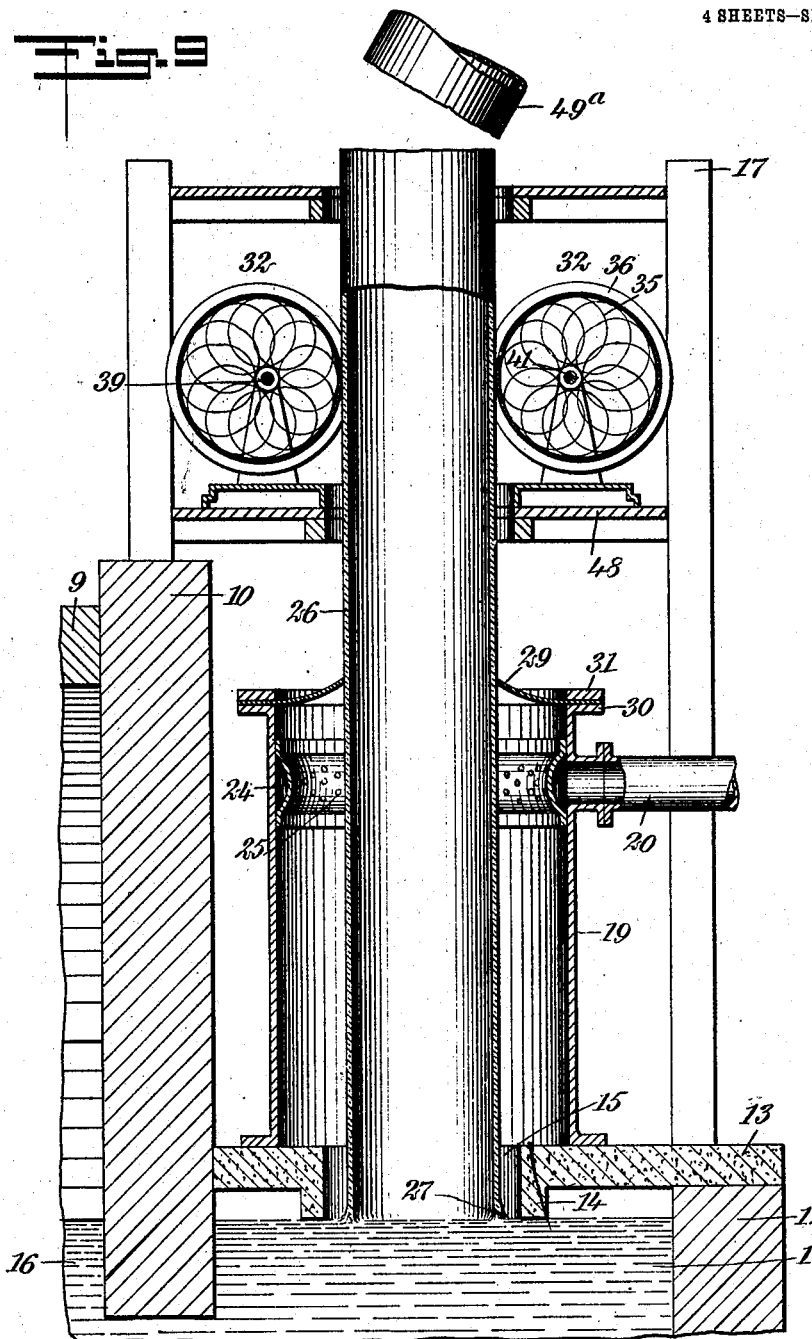

UNITED STATES PATENT OFFICE.

HARRY D. HERSHEY, OF LATROBE, PENNSYLVANIA.

CONTINUOUS-DRAW VACUUM WINDOW-GLASS MACHINE.

No. 901,170.　　　　　Specification of Letters Patent.　　　Patented Oct. 13, 1908.

Application filed January 22, 1908. Serial No. 412,104.

*To all whom it may concern:*

Be it known that I, HARRY D. HERSHEY, a citizen of the United States, and a resident of Latrobe, in the county of Westmoreland and State of Pennsylvania, have invented a new and Improved Continuous-Draw Vacuum Window-Glass Machine, of which the following is a full, clear, and exact description.

My invention relates to glass drawing, and more particularly to a method of drawing glass in cylindrical form suitable for flattening out in order to make window glass, and also to the method of shaping the glass by forming a partial vacuum around the cylinder of glass as such cylinder is formed.

My invention further relates to certain improvements in construction whereby the general efficiency of glass drawing machinery is promoted.

More particularly stated, my invention comprises a method and means whereby a cylindrical column of glass is drawn upward from a body of molten glass, and the cylindrical form of the rising column is maintained and its diameter rendered substantially uniform, which is done by creating a partial vacuum around the column as the latter is formed, air being meanwhile admitted freely to the interior of the column.

My invention also provides for discarding the use of a bait after the cylindrical glass column is started, a portion of the column itself being solidified sufficiently to serve as a lifting member for the more viscous portions of the column, and the column being formed continuously and at intervals cut off in sections from its upper end.

Reference is to be had to the accompanying drawings forming a part of this specification, in which similar characters of reference indicate corresponding parts in all the figures.

Figure 1 is a side elevation showing a number of drawing machines connected with a single blower for forming partial vacuums, one around each rising cylindrical column of glass; Fig. 2 is a section through one end of the glass furnace showing the glass well, and the bait drawing upwardly therefrom, a tubular column of glass, this view further showing the extracting apparatus whereby a partial vacuum is formed and maintained first around the bait and then, as the bait moves upwardly, how the atmospheric pressure is transferred to the glass column alone; Fig. 3 is an enlarged plan view of one of the base plates, carrying lifting wheels covered with asbestos jackets for engaging the hot glass column and raising the same carefully but continuously, this view showing the gearing for actuating the lifting wheels; Fig. 4 is a side elevation of one of the base plates, showing the lifting wheels and gearing for actuating the same; Fig. 5 is an enlarged view showing in section the bait tube and in plan the upper end of the annular valve member used for encircling the bait tube and the glass cylinder; Fig. 6 is a substantially central vertical section through the vacuum chamber, and shows the bait tube dipping into the molten glass and ready to draw upwardly therefrom a cylindrical column of glass; Fig. 7 is a section through one of the shafts supporting the various lifting wheels, this view showing how the rim of each wheel is rendered elastic relatively to the shaft so as to give the whole rim a spring action relatively to its supporting shaft; Fig. 8 is a detail section through one of the lifting wheels, showing how the springs are mounted upon the hub, and how the rim and its accompanying parts are secured upon the springs so as to allow the rim, under a gentle pressure, to become slightly eccentric in relation to the shaft; and Fig. 9 is an elevation showing the glass column having its upper end raised considerably above the friction wheels and sufficiently cool and firm to be broken or cut into sections, this view further showing how the friction wheels exert a gentle upward pressure, evenly distributed, upon the glass column so as to lift it continuously.

A glass furnace is shown at 9 and is provided with a wall 10 and a door 11 of usual construction.

At 12 is a clearing tank which is covered by a top stone 13 provided with an opening 15 and with a neck 14 encircling this opening. The main body of molten glass is shown at 16 and at 17 is a smaller body of glass within the clearing tank 12, and connected with the main body 16 of glass but partially separated therefrom by the wall 10 so as to prevent, as far as practicable, the entrance of floating impurities into the clearing tank 12.

A framework 17ª sustains a number of platforms 18 for supporting various movable parts as hereinafter described. Several vacuum chambers 19 are provided, each being mounted upon a top stone 13, and connected with each vacuum chamber is a pipe 20 provided with a hand valve 21, the several pipes 20 being connected together by pipe sections 23, the latter being joined by thimbles 22 so as to form a continuous pipe. A blower 23ª is connected with this pipe and is adapted to create a partial vacuum in each of the various vacuum chambers 19.

Mounted within the vacuum chamber 19 is a ring 24 of substantially semi-tubular form and provided with perforations 25 (see Fig. 6). Disposed centrally within the vacuum chamber 19 and concentric to the ring 24 is a bait tube 26 having at its lower end a thickened portion 27 serving as a bait. The upper end of the bait tube is provided with ears 28 whereby it may be lifted. A valve 29 of flexible sheet asbestos is mounted upon the upper end of the vacuum chamber 19, which is provided with an annular flange 30 and a clamping ring 31 for the purpose of holding this valve in position.

Friction wheels are shown at 32, and each is provided with a hub 33 having faces 34 inclined slightly in relation to each other, as will be understood from Fig. 8. Metallic rings 35, 35ª, 35ᵇ are connected with the hub and support a concave rim 36 covered with an asbestos jacket 37 having substantially the same conformity as the rim. The rings 35, 35ª, 35ᵇ are made of spring metal and are adapted to allow the rim 36 carrying the asbestos jacket 37 to become eccentric in relation to the hub 33.

It will be noted from Fig. 8 that the rings 35, 35ª, 35ᵇ lie in planes which are slightly inclined toward each other. This distributes the strain and prevents the rim from having undue play in the general direction of the length of the axis of the hub. Fastenings 38, 38ª are employed for securing the rings 35, 35ª, 35ᵇ in position. The lifting wheels are mounted upon shafts 39, 40, 41, 42. A gear wheel 43 is mounted rigidly upon the shaft 39 and meshes with a pinion 44 in order to turn the shaft 39, said pinion being mounted on a shaft (not shown) leading from a source of power. Bearings 45 are provided for the various shafts and mounted rigidly upon these shafts are bevel gears 46, 47, meshed in pairs, as shown in Fig. 3, for the purpose of transmitting power from one shaft to another. When, therefore, power is applied to the pinion 44, it is transmitted through the gear wheel 43, the various shafts 39, 40, 41 and 42 and bevel gears 46, 47, so that the various lifting wheels 32 engaging the bait tube 26 (and later engaging a glass column 49) press uniformly thereupon and exert a gentle lifting effect, which is continuous.

Each platform 18 is provided with a circular opening 18ª, through which the bait tube and the glass cylinder may be raised.

The operation of my device is as follows: The bait tube 26 is lowered until the bait 27 engages the surface of the molten glass 17 in the clearing tank 12. Power being now applied through the pinion 44 and gear wheel 43 to the shafts 39, 40, 41 and 42 and bevel gears 46 and 47, as above described, the various lifting wheels 32 all turn in such direction that their innermost portions travel upward. This raises the bait tube 26, and as the bait 27 leaves the molten glass, a cylinder 49 of glass is formed. Meanwhile the blower 23ª being in operation, a partial vacuum is formed within the vacuum chambers 19, the tendency of this vacuum being to expand the cylinder 49 of glass, the air being free to enter this cylinder through the bait tube 26. The surface tension of the glass of this cylinder tends to cause the cylinder to contract, and this is just compensated or balanced by the atmospheric pressure. The result is that the glass cylinder is of uniform diameter, this diameter being substantially the same as that of the bait tube 26. The bait tube 26 is soon raised entirely out of the vacuum chamber and out of engagement with the valve 29 so that this valve engages directly the outer surface of the glass cylinder 49. The partial cooling of the part of the glass cylinder engaged by the valve 29 enables a substantially airtight engagement to be made between the glass cylinder and this valve. If there should be leakage through the asbestos valve 29, it is compensated by the blower 23ª so that the partial vacuum within the vacuum chamber 19 is at all times substantially uniform.

The glass cylinder, upon reaching the lifting wheels 32, is cooled and consequently solidified to such a degree as will prevent mutilation, abrasion or tearing of the glass cylinder or injury to the asbestos jacket covering the friction wheels. Since, however, the glass cylinder is very delicate and also very heavy, it is necessary that its weight be distributed as nearly equally as possible, and that the lifting effect of the friction wheels upon the cylinder shall be applied at a number of separate points. It is upon this account that I give the lifting wheels the particular shape above described. This also explains why the rims are spring-mounted relatively to the hubs so that each wheel can assume an eccentric shape.

It will be noted that the pressure exerted by the friction wheels against the glass cylinder, is so applied that the weight of the glass cylinder is supported by the joint action of the four friction wheels, and furthermore that the rim of each wheel being spring-mounted, the various lifting wheels adjust themselves automatically to the glass cylinder and apply their pressure equally upon it. Moreover, this pressure is applied upon the convex surface of the glass cylinder so as to avoid a possibility of pressing the cylinder inward.

The glass cylinder being raised to a sufficient height, and during this time becoming sufficiently cool, is separated into sections 49ª in the manner heretofore employed. It will be noted that the spring action of the friction wheels enables these wheels to adjust themselves to variations in the relative diameters of glass cylinders, as the latter are being drawn. By using bait tubes 26 of different diameters and varying the speed of the blower 23ª, the operator may, at will, draw out glass cylinders of different diameters. The thickness of the glass can also be varied to some extent by varying the rapidity of the lift and properly adjusting the speed of the blower.

When the glass cylinder is drawn and separated into sections, as indicated in Fig. 9, each section is split and flattened out and worked up into window glass in accordance with the manner heretofore known.

It will be noted that in accordance with my invention, the vacuum or negative pressure is exceedingly uniform in its action and is different from pressures heretofore employed for shaping the cylinder. It will also be noted that the method employed in my invention is easy of application, exceedingly simple and far more economical than others employed heretofore. The glass produced is of good quality, and may be made comparatively soft for the reason that it is drawn directly from the clearing tank and is not exposed to the outer atmosphere until after it is practically completed. It will also be noted that in accordance with my invention, a single glass cylinder can be drawn continuously or made of indefinite length, or may be separated into any number of sections, without interrupting the process of continuous drawing. It will be further noted that because of the facility for increasing or reducing the vacuum upon the outer walls of that portion of the cylinder within the vacuum chamber, taken in connection with the exposure of the inner walls to atmospheric pressure applied through the open end of the cylinder, various advantages are offered as regards the quickness with which the work can be done, and moreover the accessibility of the various parts is greatly facilitated.

Having thus described my invention, I claim as new and desire to secure by Letters Patent:

1. The combination of a vacuum chamber, a valve connected therewith, a receptacle for holding molten glass, a bait tube provided with a portion for entering said receptacle, said bait tube engaging said valve, and means for maintaining in said vacuum chamber a pressure differing from atmospheric pressure as said bait is raised.

2. The combination of a receptacle for holding molten glass, a vacuum chamber disposed adjacent to said receptacle and provided with a valve, means for drawing from said molten glass a member adapted to engage said valve for the purpose of forming a substantially airtight connection therebetween, and means for varying atmospheric pressure within said vacuum chamber.

3. The combination of a receptacle for holding molten glass, a vacuum chamber disposed over said receptacle and provided with a valve, means for causing a partial vacuum within said vacuum chamber, and a bait for drawing out a column of glass and bringing the same into substantially airtight engagement with said valve.

4. The combination of a receptacle for holding molten glass, a vacuum chamber disposed adjacent to said receptacle, a valve mounted upon said vacuum chamber and adapted to engage directly the surface of a member of glass drawn out from said molten glass and passing through said vacuum chamber, and means for removing air from said vacuum chamber.

5. The combination of a receptacle for holding molten glass, a vacuum chamber disposed adjacent to said receptacle, means for passing through said vacuum chamber a longitudinal member of glass drawn out from said molten glass, means for preventing ingress of air into said vacuum chamber, and mechanism for removing air from said vacuum chamber.

6. The combination of a receptacle for holding molten glass, a bait movable relatively to said receptacle for the purpose of drawing a portion of said glass into a predetermined form, and mechanism for applying to said member a partial vacuum for the purpose of maintaining said member in a predetermined shape.

7. The method herein described of forming glass, which consists in dipping into a volume of molten glass a bait, withdrawing said bait so as to draw with it a member of molten glass, and maintaining said member in a predetermined shape by applying a partial vacuum to a portion of its exterior.

8. The method herein described of forming glass, which consists in drawing molten glass into the form of a cylinder, subjecting the exterior of said cylinder to pressure differing from atmospheric pressure and exposing the interior of said cylinder to air at ordinary atmospheric pressure.

In testimony whereof I have signed my name to this specification in the presence of two subscribing witnesses.

HARRY D. HERSHEY.

Witnesses:
A. G. OSBORNE,
L. G. KISTNER.